Dec. 20, 1932.  G. T. RONK  1,891,556
TRACTOR TREAD
Filed Feb. 28, 1928   2 Sheets-Sheet 2

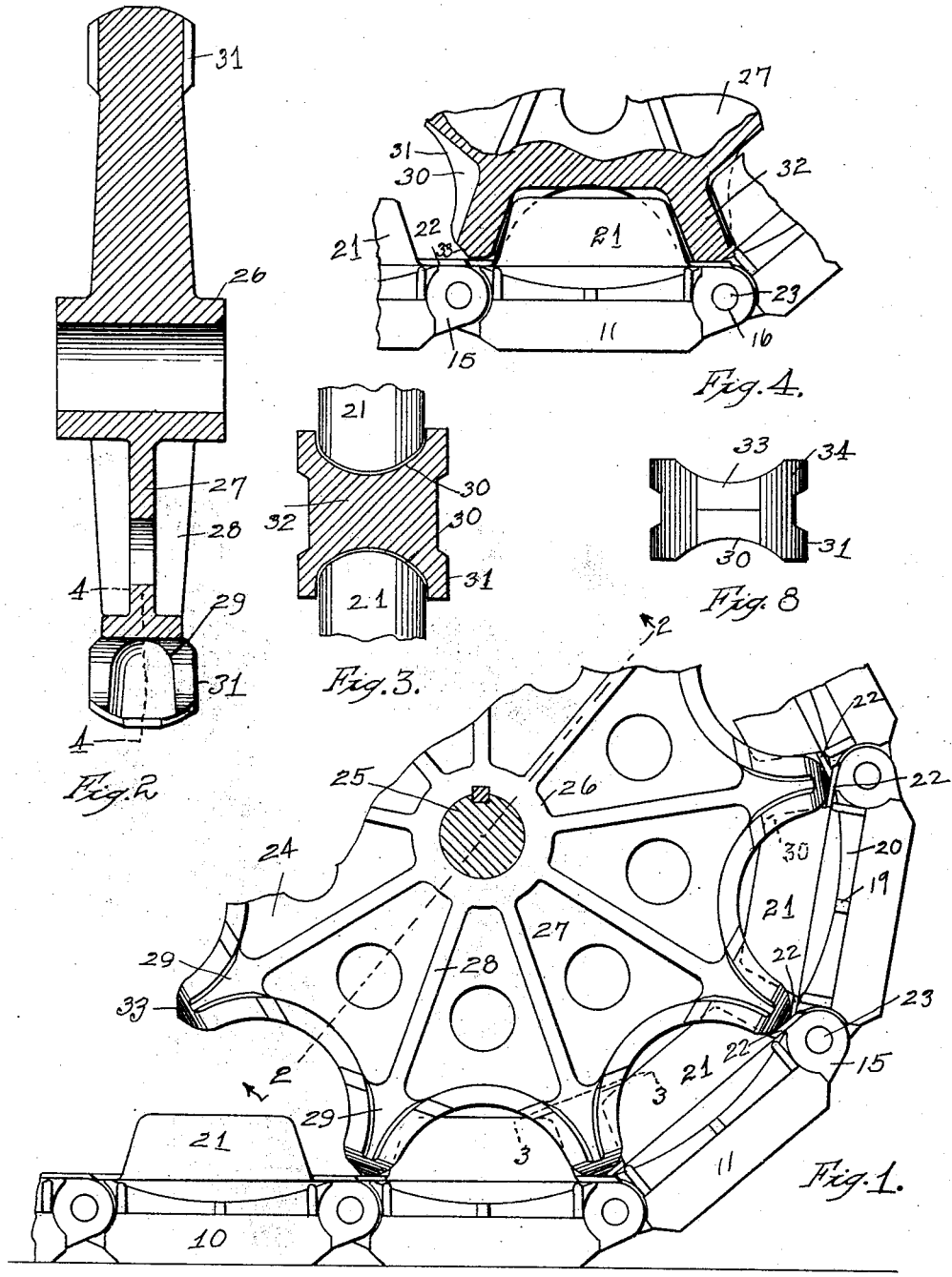

Inventor
George T. Ronk
by Owing & Hogue Attys.

Patented Dec. 20, 1932

1,891,556

UNITED STATES PATENT OFFICE

GEORGE T. RONK, OF CEDAR RAPIDS, IOWA

TRACTOR TREAD

Application filed February 28, 1928. Serial No. 257,774.

This invention relates to improvements in link treads, and particularly to the sprocket for imparting motion to the tread.

Considerable difficulty has been experienced in sprockets of this type due to the fact that there is a great tendency for the tread to move laterally relative to the sprocket, due to the twisting and turning action of the tread, and also in small stones and the like wedging between the ends of the sprockets and the link member of the tread.

It is, therefore, the object of my invention to provide a simple, durable and inexpensive tractor tread having means whereby the tread members are firmly held against lateral movement relative to the sprocket when the tread members are passing around the same, and to so shape the ends of the sprocket teeth and the tread members that when they co-operate, small stones and the like will be pinched and crowded out of position as the sprocket tooth is moved to position relative to the tread members.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a segmental side elevation of my improved sprocket showing a portion of the link tread applied thereto.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 2.

Figure 8 is an end view of one of the sprockets.

Figure 7:
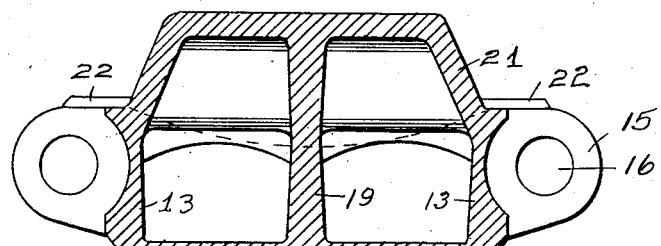
Figure 7 is a sectional view taken on the line 7—7 of Figure 5.
Figure 6:
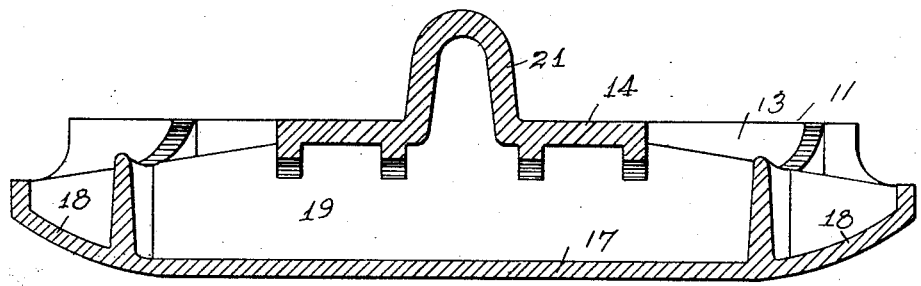
Figure 6 is a detail sectional view taken on the line 6—6 of Figure 5.

My improved device comprises a tread member 10 consisting of a series of shoes 11 which are linked together. Each of the shoes comprises a hollow body portion 12 having side members 13 and a top member 14 supported across the central portion of said side members. The outer faces of the side members 13 are provided with a series of spaced lugs 15 to form hinge members, each of the lugs having an opening 16 for receiving the pivot pin. The lugs of one side member are in staggered relation with those of the other. A bottom member 17 is provided having its ends curved upwardly at 18. A partition or rib 19 is provided centrally through the body and beneath the top 14. The corresponding hinge members at the ends of the side members being connected by means of a diagonally arranged rib 20. This provides means for tying the said hinge members together. The top plate 14 is provided with a driving lug 21 formed hollow and communicating with the interior of the body portion. The top portion of the body at each end is left open, to provide means whereby the cores may be supported by suitable core prints, thereby providing a tread shoe which may be formed of a single casting, and in which the cores may be easily supported while casting and removed after casting.

The driving lug 21 is substantially rectangular in formation and is tapered outwardly and arranged with its axis longitudinally of the tread. The front and rear edges of the lug are convex for the purpose of entering sockets provided in the sprocket hereinafter described.

Figure 5:
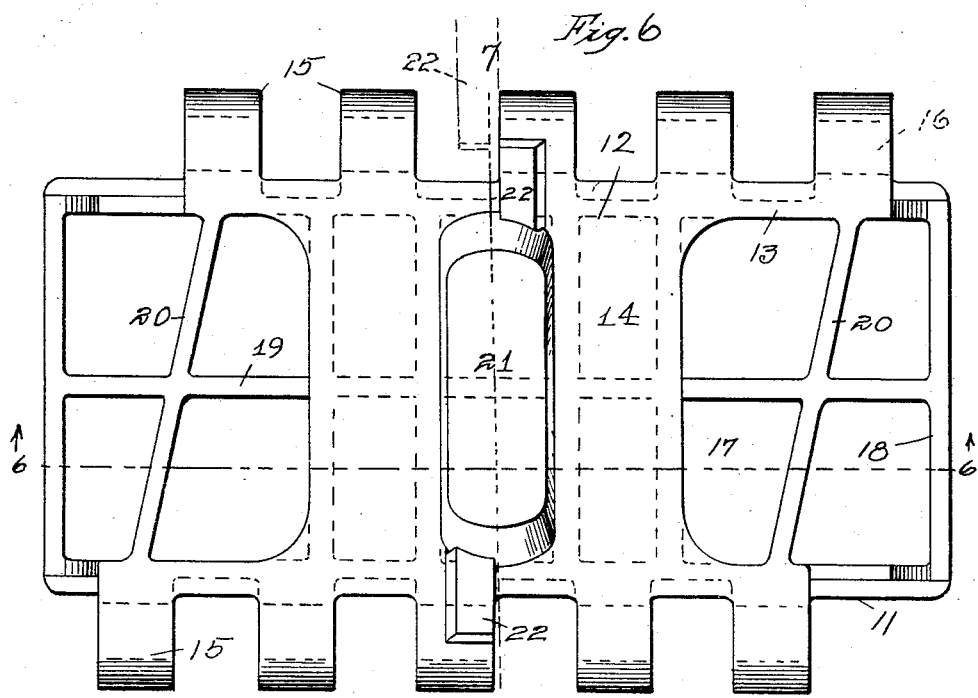
Figure 5 is a plan view of one of the shoes of the link tread designed to be used in connection with my improved sprocket.

On top of the member 14 at each end of the lug 21 is a raised portion or boss 22, the ends of which terminate at a point substantially in vertical alinement with the center of the openings 16. Said bosses are of a width preferably less than half the width of the lug 21 and project above the member 14 a slight distance, about one-eighth of an inch. One of the bosses 22 is mounted on one side of a longitudinal line running through the center of the lug 21, and the other on the opposite side of said central line, so that when two of the shoes are linked together the front boss 22 of one of the shoes will join the rear lug of the opposite shoe, when the shoes are supported in a horizontal position or in common alinement. The relative position of the bosses 22 is illustrated in Figure 5, one of the ribs being illustrated by dotted lines. The purpose of these bosses will be hereinafter more fully set forth.

In Figure 1, I have illustrated a number of the shoes pivoted together by means of suitable pivots 23, and the manner in which they are applied to a sprocket wheel 24. The sprocket is mounted on a suitable shaft 25. Said sprocket comprises a hub 26 for supporting a web 27 having a series of radial ribs or flanges 28, each of which terminates in a sprocket 29. Each of the sprockets 29 has its contact surface formed somewhat concave to provide pockets 30 for receiving the convex edges of the lugs 21, in such a manner that when the tread member is supported on the sprocket, the lugs 21 will enter the pockets 30 and provide means whereby the said lugs and the shoes supported thereby will be held against lateral movement relative to the sprockets, and to provide means whereby the shoes are positively held in proper alinement with said sprockets against any twisting movement that may take place during the time that the tread member is being turned.

Each of the sprockets 29 is provided with flanges 31 which form pockets of suitable width without increasing the thickness of the sprocket. The web portion 32 of each of the sprockets 29 between the pockets 30 is so shaped as to fit the two adjacent ends of the lugs 21 at the time the tread member is being passed over the sprocket in the manner clearly illustrated in Figure 4, so that there is practically no tendency toward the lugs moving radially from the center of the sprocket on account of the driving action between the sprockets and the said lugs. The ends of each of the sprockets are beveled in the manner clearly illustrated in Figure 4, so that beveled faces 33 of said sprockets will engage the bosses 22 of the shoes, the said bosses resting squarely against said beveled edge. The width of the beveled edges is twice the width of the bosses 22.

By this arrangement it will be seen that one of the bosses 22 will make contact with half of the face of one of the beveled portions 33, and the other boss 22 will make contact with the opposite half of the other beveled portion 33, so that any stones or other obstructions that might rest on the bosses 22 will be crowded over the ends of the said bosses or tilted sideways. The said bosses being comparatively narrow, ordinary stones and the like will roll to one side to such an extent that if a stone should be gripped between the end of the sprocket 32 and one of the lugs 21 at the time the sprocket enters the space between the two adjacent lugs, said stone will be forced laterally, and thereby provide means whereby stones and other obstructions will be automatically crowded out of position where they will be likely to wedge between the ends of the sprockets and the hinge member of the shoes, or between the sprockets and the driving lugs.

To further increase the tendency toward obstructions being moved laterally, the sides of the ends of the sprockets are provided with curved surfaces 34.

Thus it will be seen that I have provided a tread for tractors and the like which comprises a series of linked shoes operating over suitable sprockets of simple construction, whereby the shoes when passing over the said sprockets will be held rigidly against any lateral movement relative to the sprocket and at the same time provide means whereby any obstructions will be positively dislodged from position between the sprockets and the coacting parts of the tread members.

It will further be seen that I have provided a co-operating shoe which may be constructed of a single casting and which is formed hollow and of light and strong construction, and provides means whereby the cores may be easily and positively supported, and may be easily and quickly removed after the casting has been made.

I claim as my invention:

1. A tread for tractors comprising a tread member formed of a series of pivoted shoes, a sprocket wheel having spaced teeth for supporting and imparting movement to said tread member, each of the teeth of said wheel having its contact surfaces provided with radially projecting pockets and its outer end beveled transversely, each of said shoes being provided with inwardly extending lugs for entering said pockets, and ribs for engaging the beveled faces of said teeth when the tread member is being passed around said sprocket wheels.

2. In a device of the class described, a sprocket wheel having a series of teeth, the contact face of each tooth being provided with a radial concave pocket, the central portions of the outer end of each tooth having beveled faces for engaging the inner portions of two adjacent tread shoes, the side portions of the ends of said teeth being curved laterally and inwardly, for the purposes stated.

3. A tractor tread comprising a series of pivotally connected shoes, each shoe having an inwardly projecting driving lug having its contacting surface convexed radially, a sprocket wheel having radially projecting teeth, each of said teeth having each of its contacting surfaces provided with a radially concave pocket for receiving the convexed contacting surfaces of said lugs to prevent lateral movement of said lugs relative to said teeth when in contact therewith.

4. The combination of a tractor tread comprising a series of pivoted shoes, the inner surface of each shoe being provided with a contacting boss and an inwardly projecting lug, a sprocket wheel, radially projecting teeth designed to enter between the lugs of said shoes, the free end of said teeth having beveled faces to engage said contacting bosses as the shoe passes over and around said sprocket wheel, the boss carried by one shoe being staggered to the one carried by the adjacent shoe.

5. A tractor tread comprising in combination a series of pivotally connected shoes, each shoe having an inwardly projecting driving lug, the front and back edge of each of said lugs being convex longitudinally thereof, a sprocket having radially projecting teeth, the front and back edges of said teeth each having a longitudinally extending concaved pocket for receiving the convex surface of a coacting lug to prevent lateral movement of the lug relative to its coacting sprocket tooth.

GEORGE T. RONK.